US012811947B2

(12) United States Patent
Chen

(10) Patent No.: US 12,811,947 B2
(45) Date of Patent: *Nov. 24, 2026

(54) COMMUNICATION PORTAL INCLUDING AN INFORMATION SPACE PROVIDED DURING A VIDEO CONFERENCE

(71) Applicant: Zoom Video Communications, Inc., San Jose, CA (US)

(72) Inventor: Tania Sung-Yi Chen, Cupertino, CA (US)

(73) Assignee: Zoom Communications, Inc., San Jose, CA (US)

(*) Notice: Subject to any disclaimer, the term of this patent is extended or adjusted under 35 U.S.C. 154(b) by 84 days.

This patent is subject to a terminal disclaimer.

(21) Appl. No.: 18/948,963

(22) Filed: Nov. 15, 2024

(65) Prior Publication Data

US 2025/0080541 A1 Mar. 6, 2025

Related U.S. Application Data

(63) Continuation of application No. 18/104,003, filed on Jan. 31, 2023, now Pat. No. 12,177,222.

(51) Int. Cl.
*G06F 15/16* (2006.01)
*H04L 9/40* (2022.01)

(52) U.S. Cl.
CPC .................................. *H04L 63/102* (2013.01)

(58) Field of Classification Search
CPC .......................... H04L 12/1822; H04L 51/216
See application file for complete search history.

(56) References Cited

U.S. PATENT DOCUMENTS 11,190,710 B1 * 11/2021 Han .................... H04L 65/1089
11,283,746 B1 * 3/2022 Munukutla ........... G06F 40/205

OTHER PUBLICATIONS

U.S. Appl. No. 18/104,003 , "Advisory Action", Jun. 28. 2024, 4 pages.
U.S. Appl. No. 18/104,003 , "Final Office Action", Mar. 20, 2024, 11 pages.
U.S. Appl. No. 18/104,003 , "Non-Final Office Action", Aug. 25, 2023, 10 pages.
U.S. Appl. No. 18/104,003 , "Notice of Allowance", Aug. 30, 2024, 7 pages.

* cited by examiner

*Primary Examiner* — Padma Mundur
(74) *Attorney, Agent, or Firm* — Kilpatrick Townsend & Stockton LLP

(57) ABSTRACT

Systems and methods for providing a communication portal including an information space provided during a video conference are disclosed. In an example method, a computing system receives, from a first client device, a request to create a communication portal including one or more information spaces, each information space being filterable by category and including one or more information cards, each information card associated with one or more categories. The computing system receives a first indication to create a first information space associated with a first category. The computing system receives first information to be posted as a first information card within the first information space, in which the first information is related to the category. The computing system receives, from a second client device, a second indication to access the information space. The computing system provides the first information card to the second client device.

20 Claims, 12 Drawing Sheets

COMMUNICATION PORTAL INCLUDING AN INFORMATION SPACE PROVIDED DURING A VIDEO CONFERENCE

CROSS-REFERENCE TO RELATED APPLICATION

This application is a continuation of and claims priority to U.S. Ser. No. 18/104,003 entitled "Communication Portal In A Client Application" and filed on Jan. 31, 2023, the entire disclosure of which is incorporated herein by reference for any purpose.

FIELD

The present disclosure relates generally to providing a publication space within an application user interface, and more particularly, to providing a publication portal within an application.

DETAILED DESCRIPTION

Figure 1:
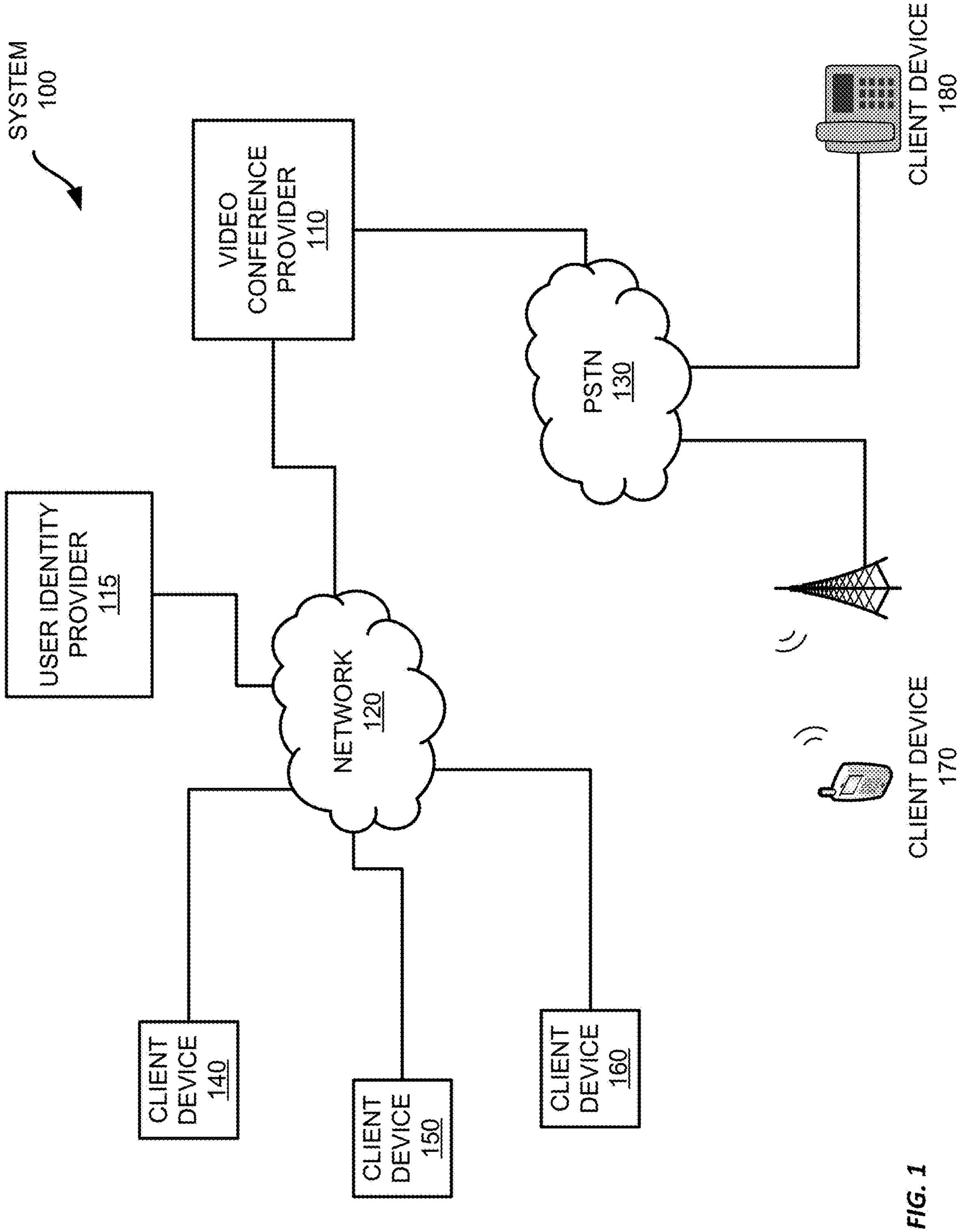
FIG. 1 is an illustration depicting an example video conferencing system in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to systems and methods for creating a communication portal within a base application that provides a space in which users can create and post information for consumption by different classes of users in an accessible and clear manner. Various types of information (or content) can be posted to the communication portal for consumption for a combination of different user types. For example, the communication portal can share company announcements for new hires, holiday events, volunteering opportunities, safety alerts, etc. with internal users while sharing company advertisements for their products or services to customers and potential customers (external users).

Usage of the communication portal also provides a simplified system and method for controlling who can create, delete, organize, and view that information. In particular, the information within the communication portal can be associated with permissions for who can create, delete, organize information therein as well as who can view that information, and how that information is viewed. Using the permissions (or memberships) the communication portal can be easily customized to the target user without having to manually create different viewing experiences. In particular, as information is created, each of the information spaces or information cards can be associated with different groups or classes of users that will be able to view that information within their respective communication portals. For example, an administrator can tag certain information cards for consumption by internal users, certain information cards for consumption by external users, and certain information cards for consumption by both internal and external users such that when those users visit their respective communication portal only the content that matches their classification (internal, external) will be posted. This simplifies the information sharing process for content creators because they do not need to manage multiple channels and member lists to achieve the same or similar results.

This also enables all members of the same classification to be quickly informed without having to be a member of multiple large chat channels with excessive system messages and other clutter. As such, the communication portal can be a space in which important information is disseminated to users without requiring users to visit multiple different sources (e.g., email, chat, intranet, web browsers, etc.) to obtain. Additionally, the communication portal can be organized in a manner in which the users do not have to take significant effort to find and access the information. The users may also be able to customize the content by subscribing, unsubscribing, minimizing, closing, etc. information within the communication portal.

Administrators and content creators can control when the communication portal is available, they can create multiple different information spaces within the content portal and can create numerous information cards without the information space(s). Additionally, the administrators and content creators can set and update the permissions for what users can view, edit, create, remove, organize, within each of the communication portal itself, the information spaces within the portal, and the information cards within the spaces. This enables a content administrator or creator simplified control to dynamically update who and when content can be consumed. For example, an administrator can access a previously created and published collection of information cards and change the permissions to add an additional user base as viewers, then all of the communication portals for the new user base can be updated to include the collection of information cards, along with any other information already delivered to those users.

The communication portal also provides a simplified dedicated space just for delivering targeted information to various users while reducing clutter within an information stream, such as a chat channel, an email inbox, or calendar application. For example, the communication portal can include one or more information spaces that include a plurality of self-contained information cards that can be viewed by and interacted with the appropriate user bases. The information cards each include their own controls through which users can react to or comment on the content of those cards. For example, a user can select an information card then elect to comment on that card within the card itself without cluttering the overall information stream within the information space that the card resides, such as by sending an email message or posting a message to a chat channel that may interrupt an on-going communication topic. In contrast, traditional data sharing methods such as chat or social media can include postings that can be cluttered by various system messages, advertisements, other user comments, user posts on topics other than the main topic under discussion, etc. between critical information posts such that a user searching for the critical information may become frustrated or miss that information entirely.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
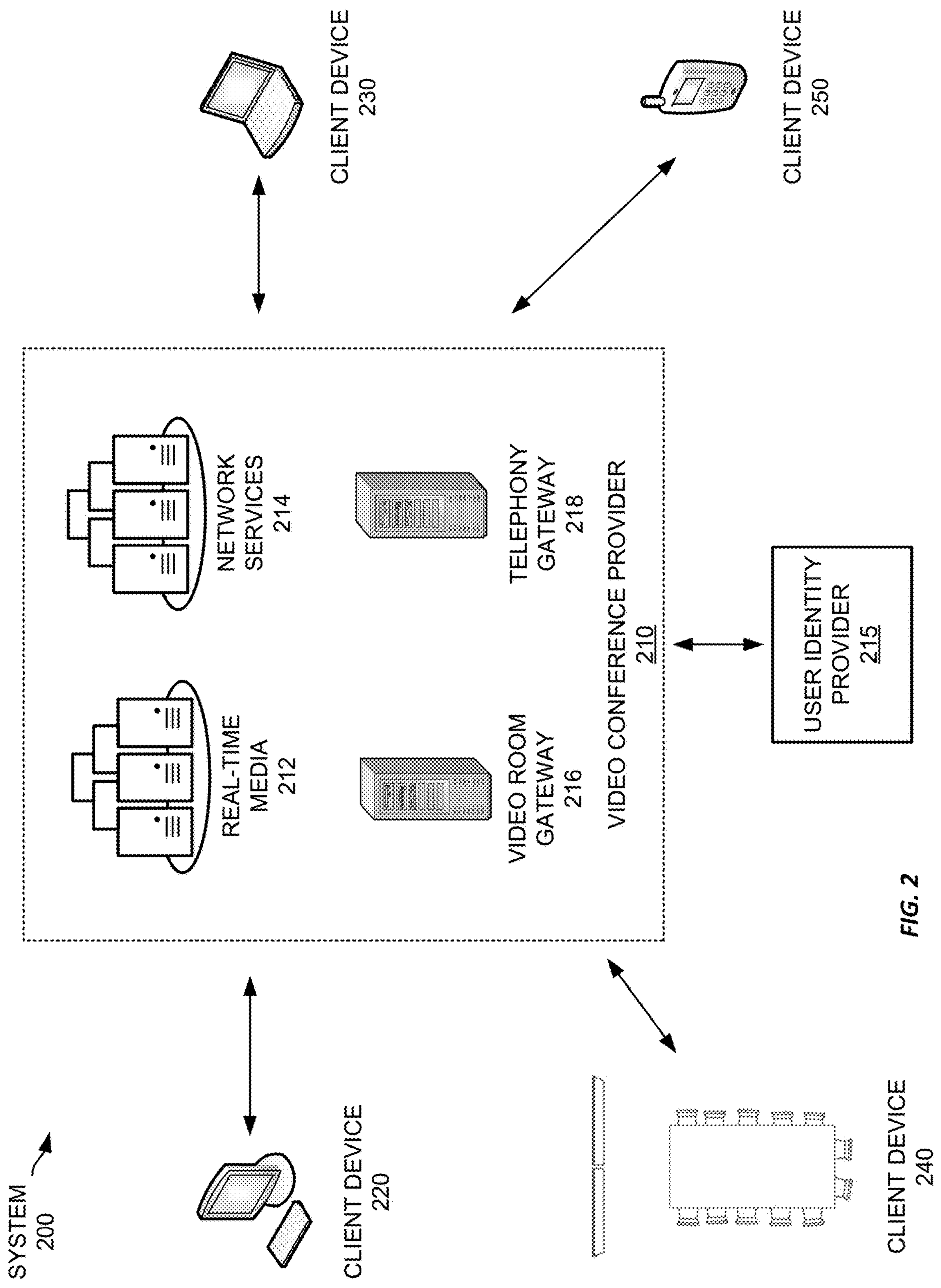
FIG. 2 is an illustration depicting an example video conferencing system in accordance with various embodiments.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, H 323, session initiation protocol (SIP), etc., including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username/password, cryptographic signature, or handshake (e.g., OAuth token, OAuth app, customer managed key, key management system (KMS)), etc. associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
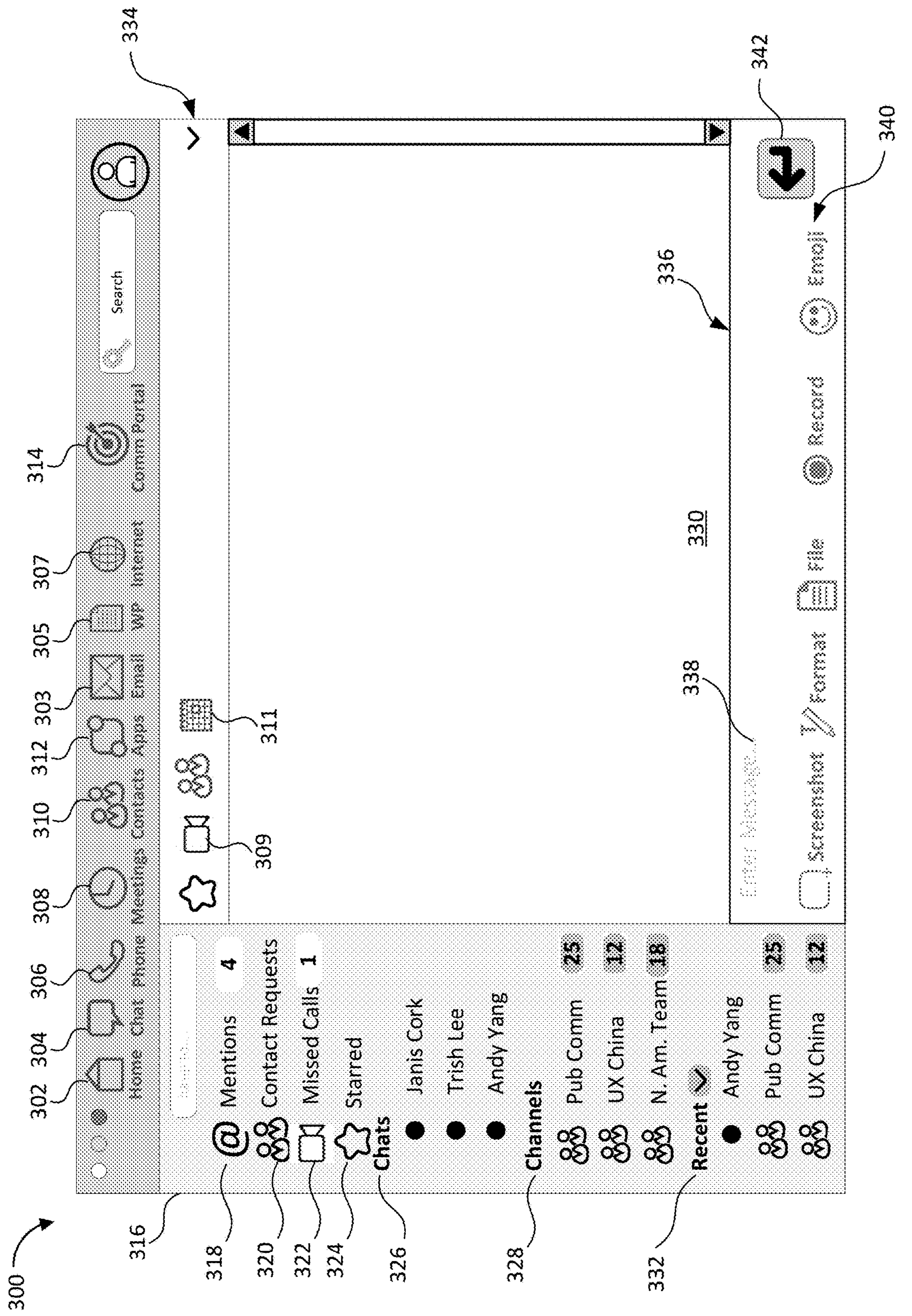
FIGS. 3A, 3B, and 3C are illustrations an example graphical user interfaces ("GUI") in accordance with various embodiments.
Figure 3B:
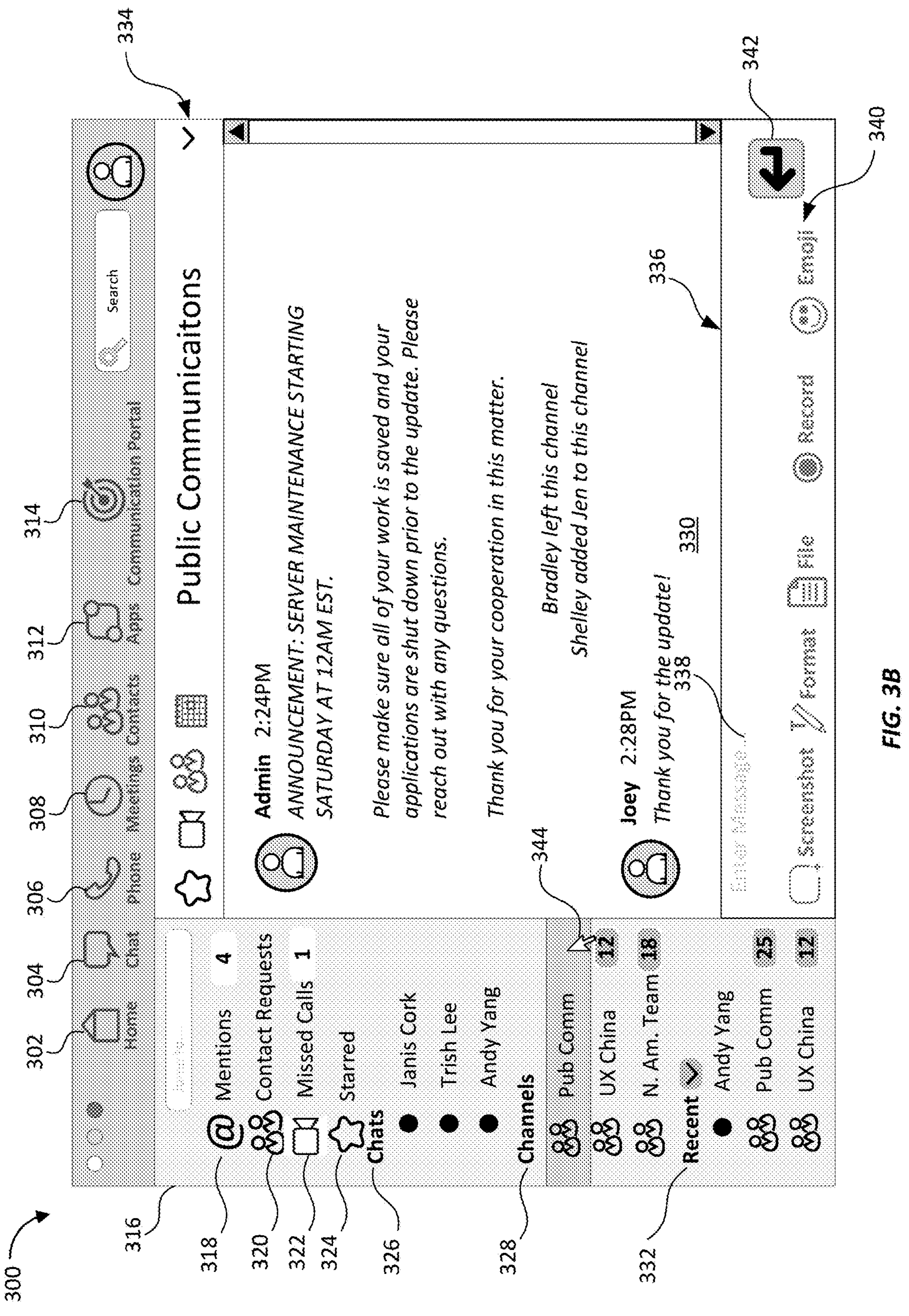
Figure 3C:
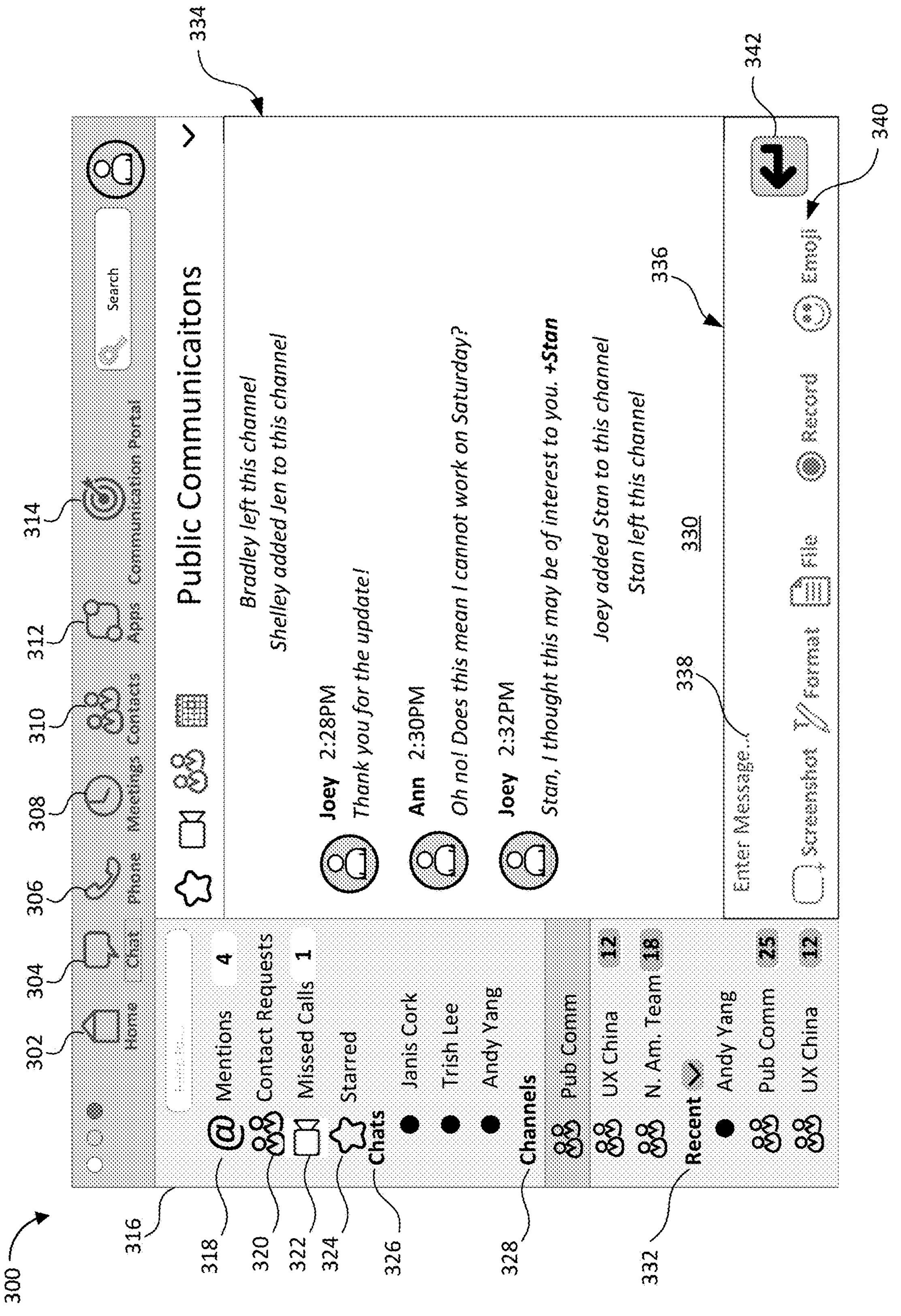

Referring now to FIGS. 3A-3C, FIGS. 3A-3C show different views of a graphical user interface ("GUI") 300 an application as a part of client software executed by a computing device (e.g., client 220, 230, 240, 250). The application providing the GUI 300 can include any combination of applications, such as an email application 303, a word processing application 305, a web browser 307, a video communication application 309, a calendar application 311, a chat application 304, etc. The GUI 300 may be displayed on a client device in response to information sent by a chat and video conference provider, such as the chat and video conference provider 210 in FIG. 2. The GUI 300 may be generated by an application, e.g., a standalone chat client or integrated into a video conferencing application, run by one or more processors stored on the client device.

The GUI 300 includes a number of options that provide different functionality by the provider of the application (e.g., the virtual conference provider 210). The options may include one or more buttons or links that switch functionalities and/or views of the GUI 300. The options can include but are not limited to options for a user home page 302, a chat interface 304, voice over IP phone interface 306, virtual meetings interface 308, contacts interface 310, third party applications interface 312, and a communication portal interface 314. For purposes of explaining the present disclosure, the GUI 300 provided in FIGS. 3A-3C is a chat application, although any other application(s) could implement the present disclosure.

The user home page 302 can return a user to a main page or landing page for the application, which can include quick links to commonly used features for that application. The chat interface 304 can load a chat screen for the user to participate with conversations with other users, as discussed in greater detail with respect to FIGS. 3A-3C. The voice over IP phone interface 306 can load a voice over IP screen for the user to participate with voice calls with other users. The virtual meetings interface 308 can load a virtual conferencing screen for the user to schedule and participate with video conferencing with other users. The contacts interface 310 can load a screen for accessing the contacts for that user. The third party applications interface 312 can load a screen for accessing any third party applications associated with the main application. The communication portal interface 314 can load a communication portal to view, comment, post, etc. content and for the user to participate with conversations with other users about the posted content, as discussed in greater detail with respect to FIGS. 4A-6.

Referring to FIG. 3A, FIG. 3A shows an example GUI 300 after a user has selected the chat interface option 304 and is presented with a view of the chat functionality. The option for chat provides access to a variety of chat functionality, including a sidebar 316 with options for mentions 318, contact requests 320, missed calls 322, and starred combinatory heading 324. The sidebar 316 also includes a list of chats 326 and chat channels 328 that the user is included as a member of that chat or channel. The chats 326 can include individual user to user chats with other users and the chat channels 328 can be chats that are part of a group of users. For example, the chats may be between the user viewing the GUI 300 and one or more other users, such as Janis Cork, Trish Lee, Andy Yang, etc., as depicted.

Similarly, the chat channels 328 may be for chats that include two or more users. For example, a chat channel for public communications may include two or more users who have access to send and receive messages within that chat channel. In some examples, the chat channel 328 may only be accessed by users who have permission to enter the chat channel 328, such as users who receive and accept an invitation to join the chat channel 328. The channels 328 can be organized into different groups, for example, public or private channels. In some embodiments, a chat channel will have one or more hosts or administrative users who have host controls over the chat channel. For example, host controls may include the ability to control who can send messages (e.g., everyone, owners and admins only or owner and specific channel members) and who can invite others (e.g., everyone, owners and admins only or owner and specific channel members).

Regardless of chats 326 of chat channels 328, messages exchanged via the chat window may only be accessible by the users of that specific chat 326 or chat channel 328. The chats 326 and chat channels 328, such as those provided in the sidebar 316, may allow user to securely communicate with each other or track communications between one another. For example, the chat window 330 can maintain a history of the various transactions and discussions within a selected chat 326 or chat channel 328. In FIG. 3A, none of the chats 326 or chat channels 328 are selected, so no chat entry functionality is displayed in the chat window 330. The content of the chats 326 and chat channels 328 may be accessible by selecting one of the chats or channels from the available chats 326 and chat channels 328.

The recent 332 heading may indicate chat channels that a viewing user of the GUI 300 has recently viewed. The recent 332 heading may provide the viewing user easy access to commonly or recently viewed or accessed chats 326 or chat channels 328. "Recently accessed" chats 326 or chat channels 328 may be determined by the client device to be a fixed number of most recent channels accessed by the viewing user or may be only those chats 326 or chat channels 328 access within a certain time, calculated from the current time.

Although only the chat headings 326, 328, and 332 are shown, other chat headings are possible. For example, some examples may include a chat heading that display, on the client device, only those channels that the user associated with the client device is a user of that have been recently accessed.

The sidebar 308 may also include one or more combinatory headings, such as the starred combinatory heading 324. A combinatory heading may aggregate one or more messages from one or more chats 326 or chat channels 328, according to a predetermined criterion. The combinatory headings 324 may include a link that, in response to a user command, cause the client device to display one or more messages in the chat window 330. The messages may be gathered from one or more chats 326 or chat channels 328, such as the chats 326 or chat channels 328, and displayed based on predetermined criteria. For example, the starred combinatory heading 324 may gather only those channels that have been tagged by a user of the client device. The tagged messages or bookmarked messages may be stored at the client device, and/or may be stored at the chat and video conference provider. The link may cause the one or more processors included on the client device to determine which messages are tagged messages and cause them to be displayed in the chat window 330. In some examples, the link may cause the client device to send a signal to the chat and video conference provider. The chat and video conference provider may then determine which messages are tagged messages and send information to the client device to generate a display of the tagged messages in the chat window 330.

The GUI 300 may include the chat window 330, a channel actionable panel 334, and a message composition panel 336. The chat channel actionable panel 334 may display one or more control buttons and/or information regarding the currently viewed chat 326 or chat channel 328. For example, the down arrow is another set of functions for managing the channel related settings (members, access, files, links, channel description, list bookmarked messages within the channel, etc.). The control buttons may include links or buttons to begin a video conference, list users, schedule a meeting, create a video message, or other tasks. The chat channel actionable panel 334 may also include a title of the chat 326 or chat channel 328 currently being displayed on the client device, such as the "Public Communication Channel" as depicted in FIGS. 3B-3C, and/or a number of users with access to the chat 326 or chat channel 328. One of ordinary skill in the art would recognize many different possibilities and configurations.

The chat window 330 may also include a message composition panel 336. The message composition panel 336 may include an input field 338, where the user can input a message and select to send the message to the chat 326 or chat channel 328. The input field 338 may be accessed by a peripheral device such as a mouse, a keyboard, a stylus, or any other suitable input method. In some examples, the input field 338 may be accessed by a touchscreen or other system built into the client device. In some examples, a notification may be sent from the client device and/or the chat and video conference provider that indicates a response is being entered into the input field 338 by the user. In other examples, no notification may be sent.

The channel actionable panel 340 may include one or more buttons that, in response to a user command, edit or modify a response input into the input field 338. For example, a record button may be provided, that allows the client device to capture audio and video. In other examples, there may be a share button that causes the client device to send the message to a different chat 326 or chat channel 328. In yet another example, there may be a reaction button that causes an image to be sent by the client device to the chat 326 or chat channel 328 in response to a message posted in the chat 326 or chat channel 328. In some examples, there may be one or more formatting buttons included on the channel actionable panel 340. The one or more formatting buttons may change the appearance of text entered in the input field 338. The user may thereby edit and customize their response in the input field 338 before sending.

The channel actionable panel 340 may include a send button 342. The send button 342 may, in response to a user command, cause the client device to send the contents of the input field 338 (or "message") to the other users of the chat 326 or chat channel 328. The client device may transmit the message to the chat and video conference provider, which may in turn transmit the message to the client devices associated with the other users of the chat 326 or chat channel 328. Upon transmission of the message via the send button 342, the message may be published within a chat window 330. As noted above, messages exchanged within the chat 326 or chat channel 328 may include image files, such as JPEG, PNG, TIFF, or files in any other suitable format, may also include video files such as MPEG, GIF, or video files in any other suitable format, or may also include text entered into the input field 338 and/or other files attached to the message such as a PDF, DOC, or other file format. In order to send a message or participate in a chat 326 or chat channel 328, the user will select a chat 326 or chat channel 328 from the sidebar 316.

Referring to FIG. 3B, FIG. 3B shows an example GUI 300 after a user has selected one of the chats 326 or chat channels 328 from the sidebar 316. For example, as depicted in FIG. 3B, a user can use a cursor 344 to select the chat channel labeled "Pub Comm" or Public Communications. Upon selection of a chat 326 or chat channel 328, the chat window 330 may be updated with a new chat window 330 or the chat window 330 can be populated with historical chat history including all the message submits since the generation of the selected chat 326 or chat channel 328. The messages may be displayed in the chat window 330 in real-time as they are exchanged between users. The chat window 330 can also include system messages and/or annotations of activity within the chat 326 or chat channel 328. System messages can be generated anytime a user joins, leaves, is added to, is removed from, etc. a chat 326 or chat channel 328. For example, as shown in FIG. 3B, "Bradley left this channel" and Shelley added Jen to this channel" are included as part of the chat history within the Pub Comm chat channel. These system messages can be populated within the timeline of messages between the users. Continuing the example in FIG. 3B, the system messages related to Bradley and Shelley have been inserted between the user messages posted by "Admin" and "Joey".

As could be appreciated, by saving all messages that are exchanged between users of the chat 326 or chat channel 328 as well as other annotations, the chat window 330 may include a large volume of messages. Not only could a large volume of messages be generated if the chat 326 or chat channel 328 is active for a long duration of time or includes a large number of users, but also if the users of the chat 326 or chat channel 328 are increasingly communicative and/or there are a large number of users entering/leaving the chat 326 or chat channel 328.

Referring to FIG. 3C, FIG. 3C shows an example GUI 300, continued from FIG. 3B, after a period of time has passed. As shown in FIG. 3C, more messages have been submitted within the chat window 330 and the announcement from Admin posted in FIG. 3B has already been displaced in the chat window 330, after only about 8 minutes. As more time passes, the further back in the chat history the posted announcement will be stored. Thus, to view this announcement (or any other earlier messages), users viewing the chat history (for Pub Comm) will need to scroll up further and further.

The chat interface option 304 may be used to create channels that are used for company-wide, workgroup wide, consumer wide, etc. announcements, alerts, etc., however, as noted above, given the nature of the chat messages, messages can be lost in the shuffle over time. Additionally, since user comments and other system messages are mixed in with the official announcements and alerts for a large audience of users, the user comments can create constant notifications. However, user may not want to mute the notifications for channels that convey important information because they may miss that important information. Therefore, a user may spend a significant amount of time checking notifications and scrolling through a chat history to see the important announcements, which may cause a user to become frustrated and avoid accessing certain chats 326 or chat channels 328.

Figure 4A:
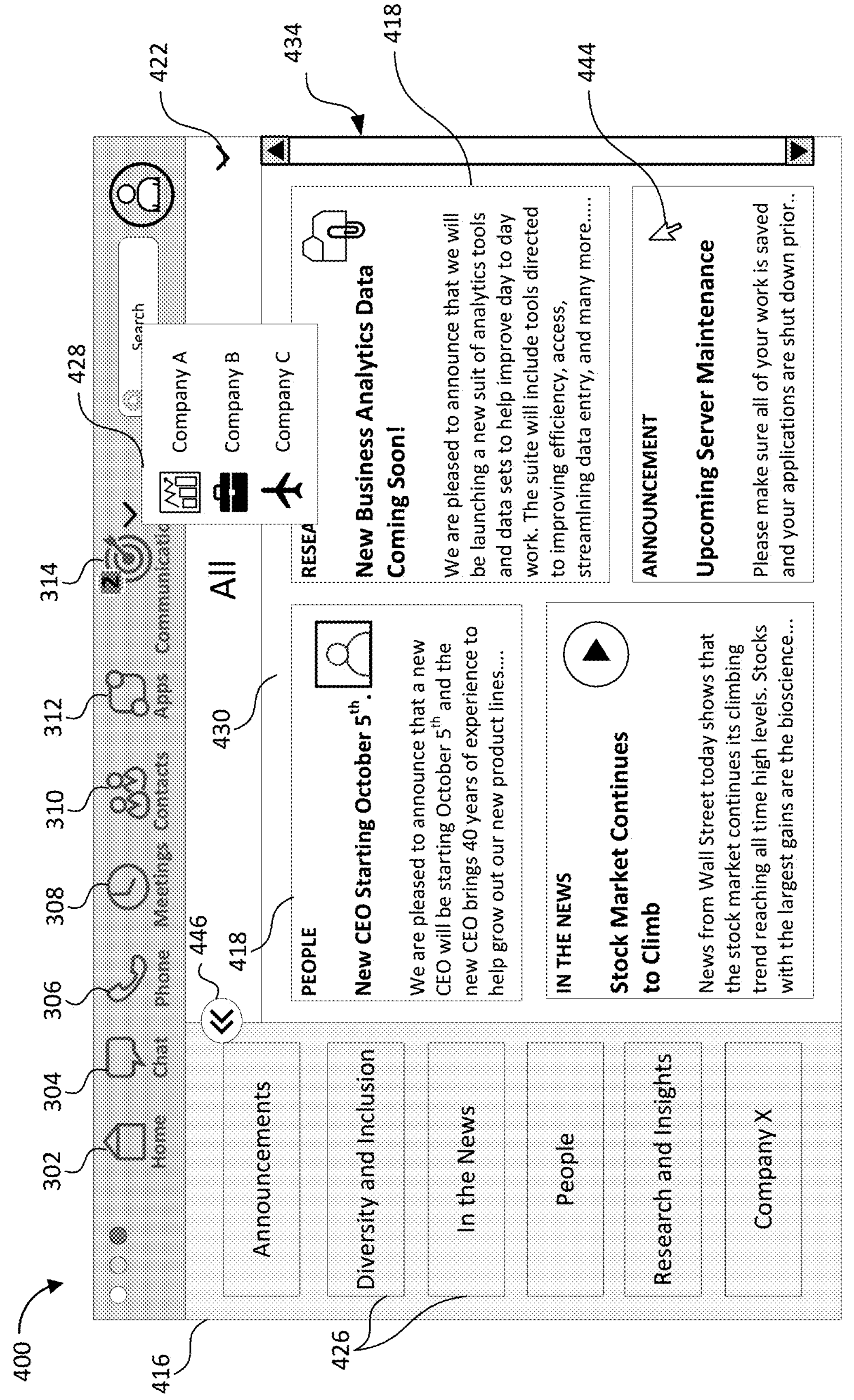
FIGS. 4A and 4B are illustrations an example graphical user interfaces ("GUI") in accordance with various embodiments.

Referring to FIG. 4A, FIG. 4A shows an example GUI 400 after a user selected the communication portal interface option 314 and is presented with a view of the announcement space functionality. The communication portal interface option 314 provides access to a variety of information sharing functionality within the base application (e.g., provided by the virtual conference provider 210), including a customizable space for posting information cards 418, interacting with existing information cards 418, and viewing the information cards 418 including various announcements, new, alerts, etc. A user can use the GUI 400 to browse and scroll through any number of information cards 418 that have been loaded within the information space window 430.

The communication portal interface GUI 400 can be loaded in response to the button for the communication portal interface 314 being selected. Some elements of the GUI 400 may remain the same as the elements from GUI 300 while other changes and/or are updated. For example, the options for the user home page 302, the chat interface 304, the voice over IP phone interface 306, the virtual meetings interface 308, the contacts interface 310, the third party applications interface 312, and the communication portal interface 314 can remain static. While some elements remain static, other elements of the GUI 400 change depending on the option that is selected. For example, when loaded from the GUI 300 (or any other of the options within the base application), the chat window 330, the channel actionable panel 340, and the message composition panel 336 may be updated or replaced by an information space window 430 including a collection of information cards 418. Similarly, the sidebar 316 may be replaced with sidebar 416 alongside the information space window 430.

The sidebar 416 can include a number of links to categories 426 for different subject matter included within the information cards 418. For example, categories 426 for announcements, diversity and inclusion, in the news, people, research and insights, company X, etc. can be included in the sidebar 416, as shown in FIG. 4A. The categories 426 can include any number of categories and are not limited to those provided in FIGS. 4A-4B. If a user selects one of the categories 426, then the information cards 418 in the information space window 430 will be filtered by the selections. For example, if the user selects Announcements, then the information cards 418 displayed within the information cards 418 will be limited to those that are marked as announcements. Therefore, a user can either select the category to see all postings of that category and/or select one of the individual information cards 418 under a category so the space is bigger and more focus on the information cards 418 the user is interested in and maybe look at all the comments and add their own comments.

Figure 4B:
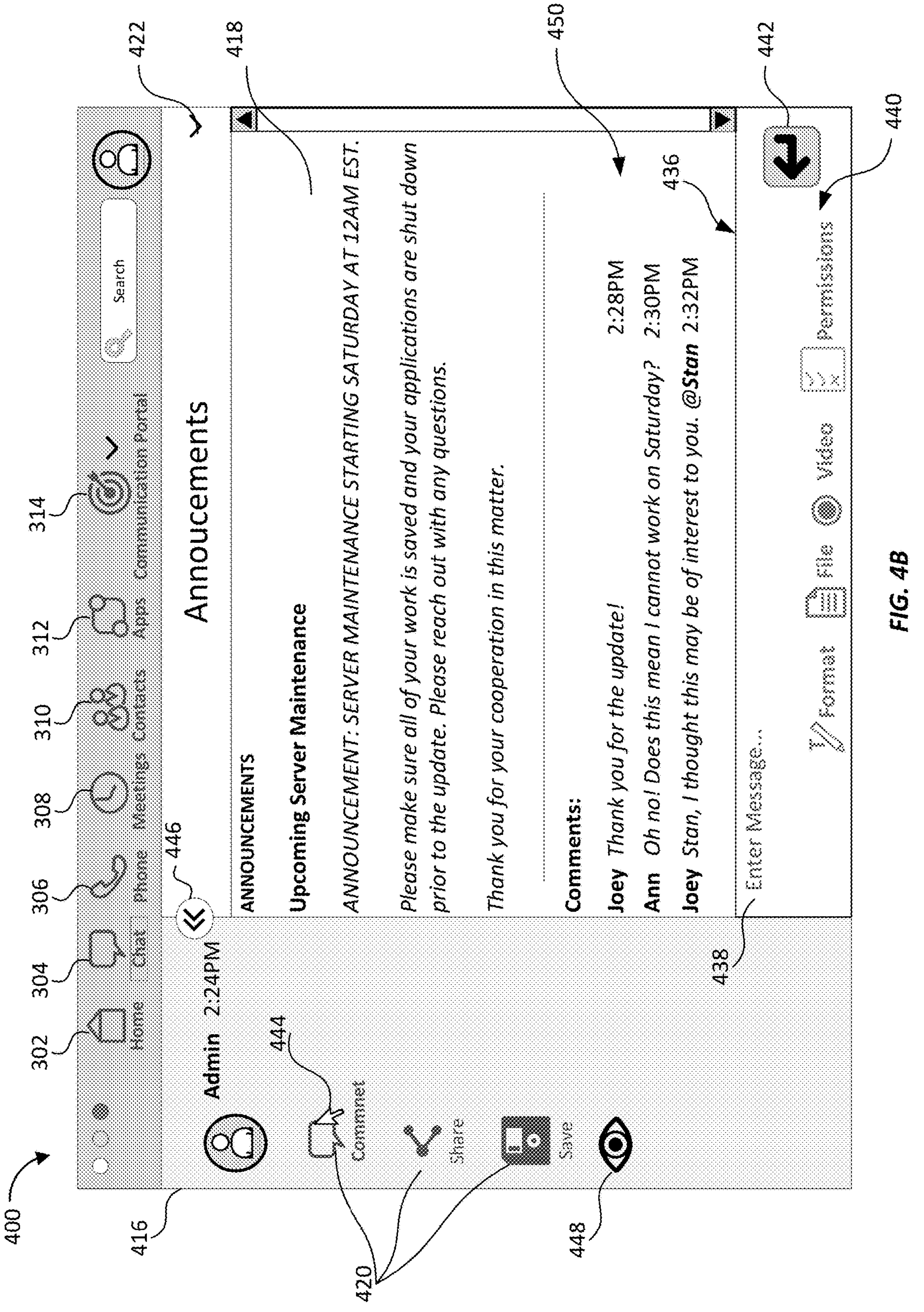

Regardless, if all information cards 418 or a subset of the information cards 418 (based on a selection of a category 426) are presented within the information space window 430, the information cards 418 can be organized using any combination of methods within the information space window 430. Similarly, the categories 426 in the sidebar 416 can be presented in any combination of methods. For example, buttons (as depicted in FIGS. 4A-4B), links, drop down menus, checkboxes, etc. Instead of using buttons 426 as depicted in the sidebar 416, any combination of menus or item lists can be provided. For example, instead of buttons 426, a topic index list of different collapsible and expandable nested lists and sub-lists can be provided. The lists and sub-lists could be customizable by the account admin who can manage the communication portal 314. The lists could be any combination of categories, such as announcements, products, etc. The buttons, menus, lists, etc. within the sidebar 416 can also be organized using any combination of methods. For example, could be sorted by date, category, alphabetically, or customizable by a user. A user can customize the content of the sidebar 416, for example, by selecting and dragging the different lists or categories to different locations. The sidebar 416 can include a hide/collapse button 446.

In some instances, the communication portal interface 314 can include a drop down menu 428 providing additional filtering and/or information space window 430 options. The drop down menu 428 can be implemented to separate information spaces from different sources. Different companies can create their own information spaces for customers and customers may subscribe or be members to the different information spaces for those companies. For example, communication portal interface 314 can include a drop down 428 including information spaces for Company A, B, and C (or however many companies or spaces the user is a member of). A company can have multiple separate information spaces with their own option within the communication portal interface 314. And while this example shows different information spaces for different companies, different information spaces may be created based on any desired criteria, such as topic, team, industry, etc. Each of the options within the drop down 428 can include its own collection of categories 426 that update in sidebar 416 upon selection. After selecting an information space through any combination of the drop down 428 and/or the categories 426, the appropriate information cards 418 can be loaded within the information space window 430.

Each of the posted information cards 418 can be a self-contained element within the information space window 430 and can be organized in a manner such that the information space window 430 does not become crowded with user comments, system messages, annotations, etc. The information cards 418 can be posted within the information space window 430 in a similar manner as a chat message within the chat window 330 or they can be organized in a more customized manner, such as depicted in FIG. 4A. For example, the information cards 418 can be posted within the information space window 430 in a scrollable feed organized by time, similar to the chat messages as discussed with respect to FIGS. 3A-3C. In another example, the information cards 418 can be organized in one or more columns, as depicted in FIG. 4A, or in other organizational manner(s). Regardless of the layout, each of the information cards 418 can be selectable by a user to expand the information card 418 for viewing in greater detail, commenting, saving, sharing, etc.

Referring to FIG. 4B, FIG. 4B shows an example GUI 400 after a user selected one of the information cards 418. For example, as depicted in FIG. 4A, a user can use a cursor 444 to select the information card 418 for an upcoming server maintenance announcement. Upon selection of the information card 418 for that announcement, the information space window 430 may updated with an expanded or unfurled version of the announcement. In addition to the expanded version of the announcement, the GUI 400 can also update the content of the sidebar 416 and portions of the information space window 430. The updated sidebar 416 can include adding different options 420 for interaction with the selected information card 418. As shown in FIG. 4B, the sidebar 416 can be updated to include additional information about the selected information cards 418, for example, the author and/or poster of the information cards 418, date of the post, etc. as well as the options 420 for interacting with the information card 418. Examples of the interaction options 420 provided in the sidebar 416 can include comment, share, save, etc. for the information cards 418. Interaction options can also be provided as part of a separate menu. For example, a user can select an information card for a company all hands meeting which can show the content of the information card as well as a vertical " . . . " icon which upon selection will list the options to comment, share, save, etc. and then share it in a chat channel per user's choice, e.g. "My direct staff". Selection of one or more of the interaction options 420 can cause further modification of the GUI 400. For example, upon selection of the comment option 420, the information space window 430 may updated to include a message composition panel 436, similar to the message composition panel 336 discussed with respect to FIGS. 3A-3C.

Instead of updating the sidebar 416 to include the different options 420, the same sidebar 416 shown in FIG. 4A can remain while the options 420 can be included in a bar within the information card 418 or below the information card 418.

The message composition panel 436 may include an input field 438, where the user can input a message or comment to be appended or posted under the information card 418. The messages may be displayed in a comment section 450 for that information card 418 in real-time, in a similar manner as messages are exchanged between users of the chat 326 or chat channel 328, as discussed with respect to FIGS. 3A-3C. For example, as shown in FIG. 4A, the comments by Joey and Anne have been posted in the comment section 450 related to the upcoming server maintenance information card 418. In some examples, a notification may be sent from the client device and/or the chat and video conference provider that indicates a response is being entered into the comment section 450 for that information card 418. For example, notifications will be provided via email if user chose to "follow" or "watch" the post by clicking on a notification icon 448. The notifications can be provided within the base application itself or pushed outside of the application. For example, as shown in FIG. 4A, a red dot (with or without a number) can be added to the communication portal interface 314 to signify a new information card post, and/or a push notification to email, SMS, etc. can be provided to a client device. In the example in FIG. 4A, the notification dot indicates that here are two new (or updated) information cards 413 that have not been viewed by the user. To reset of clear the notification, the user can visit the information space with the new cards or the user may visit the cards that are actually new to signal to the application that the user has acknowledged the new content. In other examples, no notification may be sent. The comment section 450 may not include system messages, but a log of user actions can be tracked and stored for review, for example, by a poster or admin. For example, a history of who has viewed, commented, shared, saved, etc. the information card 418 can be saved as metadata associated with the information card 418. This provides useful information for posted/admin without cluttering the comment section of the information card 418.

The channel actionable panel 440 may include one or more buttons that, in response to a user command, edit or modify an input into the input field 438. For example, the channel actionable panel 440 can include a format button, a record button and a reaction button that share similar functionality as discussed with respect to FIGS. 3A-3C. Using these buttons, the user may thereby edit and customize their response to be posted in the comment section 450. Additionally, the channel actionable panel 440 may include a send button 442, that shares similar functionality as discussed with respect to FIGS. 3A-3C. Upon transmission of the message via the send button 442, the message may be published within the comment section 450. The responses submitted to the comment section 450 may include image files, such as JPEG, PNG, TIFF, or files in any other suitable format, may also include video files such as MPEG, GIF, or video files in any other suitable format, or may also include text entered into the input field 438 and/or other files attached to the message such as a PDF, DOC, or other file format. Any of the content provided to the information cards 418, chat, comment section, etc. can all be monitored and controlled by space/account administrators. This includes being able to edit or remove content based on their discretion. The GUI 400 can include a drop down 422 for creating information cards 418, locking the information cards 418, or set permission to maintain the information cards 418, etc.

Although FIGS. 3A-3C and 4A-4B display some example configurations for chat interface 304 and communication portal interface 314, other configurations are also possible. For example, the different options 302, 306, 308, 310, 312, buttons on the general dashboard may correspond to various displays of windows being displayed on the client device. Additionally, any number of components shown in FIGS. 3A-4B may be displayed on the client device with any of the various windows. Similarly, any of the components may cease to be displayed in accordance with any of the windows.

Figure 5A:
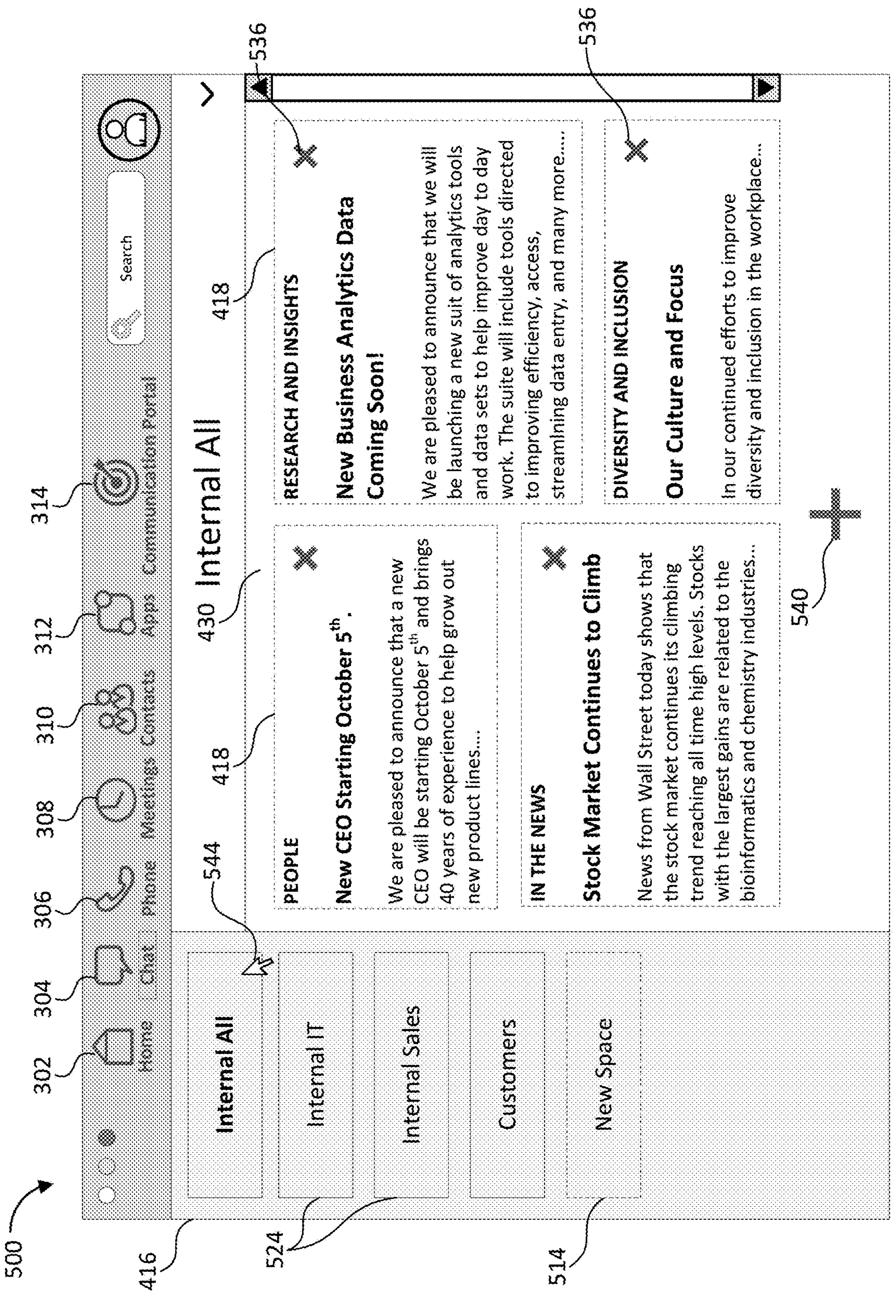
FIGS. 5A and 5B are illustrations an example graphical user interfaces ("GUI") in accordance with various embodiments.
Figure 5B:
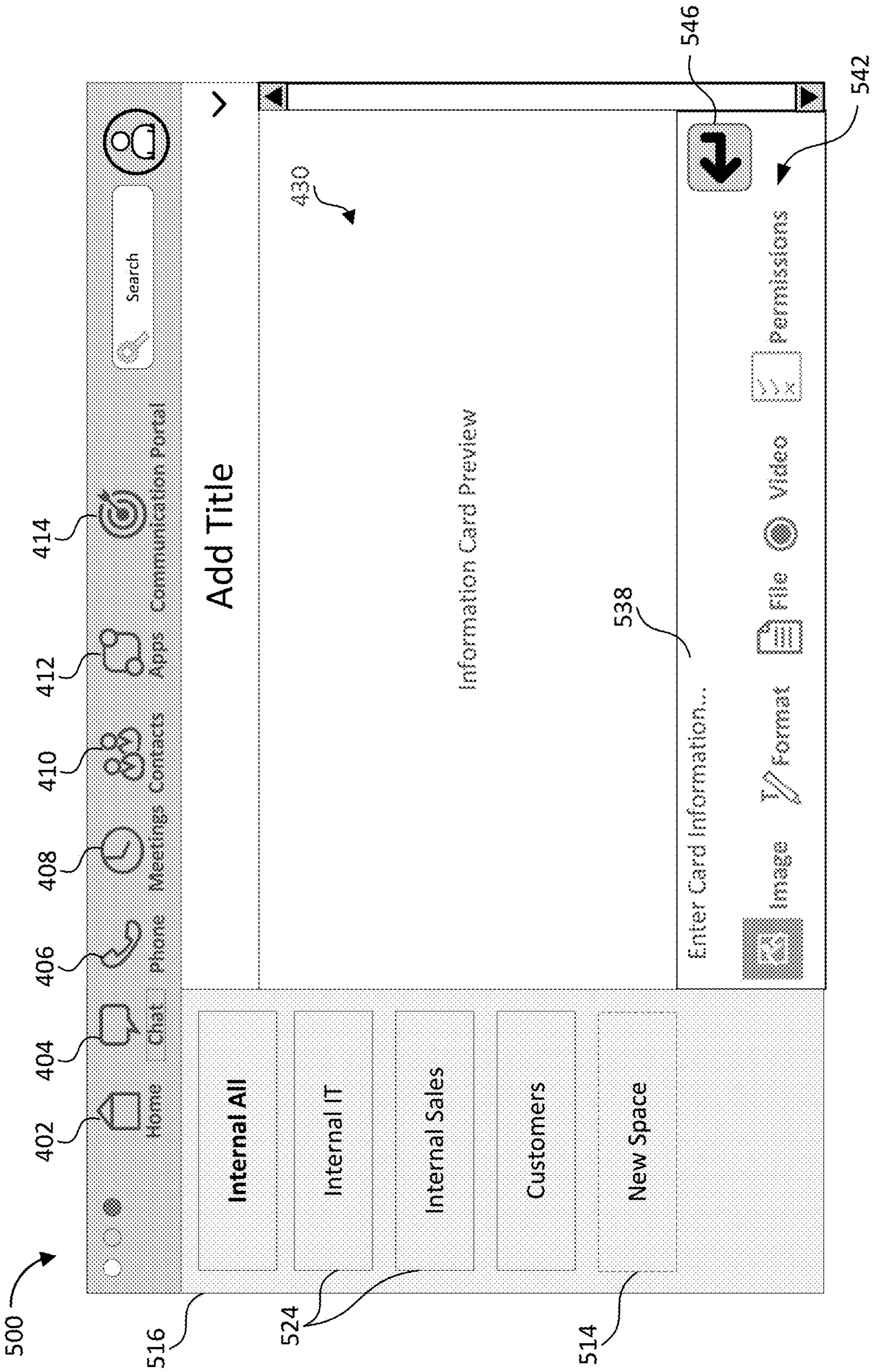

Referring to FIGS. 5A and 5B, FIGS. 5A and 5B show an example GUI 500 for creating and editing an information space (and how it is displayed within the information space window 430), for example, as shown in FIGS. 4A and 4B. From the GUI 500, a user can create, edit, remove, organize, etc. a new information space, information cards 418 within that information space, an icon associated with the information space, edit membership for the information space, or a combination thereof.

The GUI 500 can be accessible by users who want to create content for consumption by other users. For example, the users who have access to GUI 500 can be administrators, content creators, marketing personnel, etc. The GUI 500 can be accessed through the base application using a menu or option designed for those specific types of users. For example, the user can access a creator menu from a drop down 422 which can cause the GUI 500 to load. In response to a request to load the GUI 500, the information space window 430 may updated with an editable layout for an information space window 430. The editable layout can include one or more information cards 418 that were previously created for a selected information space or a blank information space window 430 (if no information space currently exists or is selected).

In addition to the updated information space window 430, the GUI 500 can also update the content of the sidebar 416. The updated sidebar 416 can include headings for all previously created information space memberships and/or categories 524. The information space memberships and/or categories 524 provided in the sidebar 416 can be the information space memberships and/or categories 524 that the accessing user has permissions to view and/or edit. For example, when a user creates a new information space, the user can identify which users can access and/or edit that space such that when the GUI 500 is opened, only those users will be notified about the space and be able to access or edit that information space and content within it. By default all new posting will be "me only" as the editor unless specific individuals or groups are added. When privileges are added there will be more options available.

Similarly, the information space memberships and/or categories 524 can include headers for different groupings, classifications, etc. of users that are able to view the information space window 430 associated with the information space memberships and/or categories 524. For example, as depicted in FIG. 5A, there can be information space memberships and/or categories 524 all internal users, a subgroup of internal users (e.g., IT group users, sales group users, etc.), external users (e.g., existing customers, target customers, etc.), a subset of external users (e.g., free customers, premium customers, etc.), or any other collection or subset of users. As discussed in greater detail herein, based on the users provided with permission to view the content of the information space memberships and/or categories 524, the GUI 400 provided to those users will be updated to include that content.

In response to a selection of one of the information space memberships and/or categories 524, the information space window 430 will be updated with the corresponding content associated with that selected information space memberships and/or categories 524. The corresponding content can include one or more information cards 418 previously created for that information space. For example, as depicted in FIG. 5A, if a cursor 544 is used to select the 'Internal All" header, the information space window 430 will load an editable version of the space designed to be viewable by all internal users and including all the information cards shown. Thereafter, a user can view, edits, delete, organize, etc. the information cards 418 included within that space. For example, the user can delete one or more of the information cards 418 using a delete option 536 or the user can change the order and/or positioning of the information cards (e.g., using drag and drop). The user can also select the add a new information card option 540 to create a new information card to be added to that information space, as discussed in greater detail with respect to FIG. 5B.

Referring to FIG. 5B, FIG. 5B shows an example of GUI 500 for creating a new information card 418 in response to receiving a user selection of option 540. In response to the selection of option 540, the information space window 430 is cleared or a new information space window 430 is created. The GUI 500 may also be updated to include an actionable panel 542. Similar to the chat channel actionable panel 340 discussed with respect to FIGS. 3A-3C, the actionable panel 542 may display one or more control buttons that are useful for creating a new information card 418. Such links or buttons can include an input field 538, where the user can input text (similar to the input field 338), one or more formatting buttons to modify the appearance of text entered in the input field 538, a file upload button for uploading a template or previously drafted information card, a record button may be provided, that allows the client device to capture or add audio and video, and permissions button for setting the permissions or preferences for the information card. Additionally, the user may be able to edit other portions of the information card, such as the title, using the input field 538. Instead of having a separate input field 538, the content can be added and edited within the information space window 430 itself. One of ordinary skill in the art would recognize many different possibilities and configurations for the provided buttons can be provided when creating an information card in accordance with the present disclosure.

Using the input field 538 and provided links or buttons, the information card 418 can be created using any combination of text, image files, audio files, video files, hyperlinks, in any combination of formats, such as JPEG, PNG, TIFF, MPEG, GIF, PDF, DOC, or other file format.

The actionable panel 542 may include a publish button 546 to submit the information card 418 once the user is done creating and/or editing the information card 418. The publish button 546 may, in response to a user command, cause the client device to send the contents of the information space window 430 to the chat and video conference provider, which may in turn save the content within the information space window 430 and associate the saved space with a particular category 524 information space for publication. Once published, users viewing the information card 418 should be able to see who the publisher is and/or editors of the post. For example, users publishing and/or editing the post can have their avatar seen as present or change the setting to limit to one person allowed to edit at one time. If a second person tries to edit, it should provide a prompt/warning that "soandso@abc.com" is editing the post.

Similarly, the information card 418 can include any combination of information that a user would like to convey, including but not limited to a title, author(s), date, timestamp, etc. Some of the information may be populated automatically (e.g., data, timestamp, etc.) whereas some of the information can be populated based on a user input in a menu or the permissions button. For example, the permissions can include an input field for the title and author, which can then be autoformatted with the paragraph text entered by the user using the input field 538. The permissions or settings can also include notification settings, for example, when to notify a user when new content is available or notify an administrator when content has been added or revised for their review. The information cards 418 can also include or be assigned clickable hashtag(s), for example, appended or posted at the end of the information card 418. The hash tags can be provided to enable users to select a topic within one information card 418 to find similar content included within other information cards 418.

The permissions button or other menu can also be used to control who can view, edit, delete, etc. the information card 418 and under what category(ies) 524 that the information card will be populated within. For example, the permissions button can include an option for selecting what users to be able to administrate the information card, which users are to digest the content, what member groups or categories or information spaces to include the information card 418 within. This can include adding the information card 418 to one or more categories, even if it is being created under one of the categories. For example, as depicted in FIG. 5B, the new information card 418 is being created under the Internal All category, but the creating user may select for the information card 418 to be posted under the Customers category as well, without requiring the user to have to manually recreate or copy the information card 418 under the second Customer category. In this instance, all internal and external consumers would have the ability to view the same information card 418. The permissions can also be used to globally post the information card 413 to all known users or to a selection of whitelisted users (or excluded from a selection of blacklisted users). All of the permissions can be linked to the created information card and stored in a manner in which the base application can load the appropriate information card when the communication portal interface 414 is loaded.

The permissions button can also include how users are able to interact with posted information cards. For example, the permissions button can include options to enable or disable comments, enable or disable a user's ability to hide the information card from view within their version of the space, etc. Additional data can be added to and/or associated with the information card once it has been created and/or posted. For example, if user comments are enabled, whenever a user posts a comment, then a comment field for that information card is created and updated with the user's comment. This should be performed such that other users viewing that information card will see the comment. Similarly, users can be notified when new information cards 418 are posted to an information space and metrics can be aggregated and saved as metadata associated with the information card to show user activity (e.g., views, saves, shares, hides, comments, etc.)

The information spaces window 430 and information cards 418 can be continuously saved such that as content is created, edited, or removed it is updated in real time. Alternatively, the content can be created edited, and removed and will not be updated until a user initiates a save or refresh operation for that content. Similarly, the comment history and other interactions with the information cards 418 can also be saved historically. The comment history may also include a count reflecting the number of comments, which can be expandable and collapsible to reveal the comments associated therewith. Similarly, the comments history can be organized using any combination of methods. For example, comments can be organized by date or popularity. Regardless of how the content is maintained or saved, historical data for each information space and information cards 418 can be periodically saved and stored (e.g., by the provider 210). Maintaining historical versions of the information space and information cards 418 allows users to audit which users made changes and/or view or revert to previous versions.

Continuing with FIGS. 5A and 5B, in addition to headers for existing information spaces, the sidebar 416 can include a new space header 514 option which can be used to generate a new information space. Upon selection of the new space header 514, a blank information window 430 will be generated and a user can begin customizing the space and adding information cards within the information space window 430. Customization of the space can include adding a title for that information space, adding information cards 418, selecting a layout or format for how the information cards 418 will be displayed within the information space window 430, etc. When a new information space is created (or after the space has already been created) the user can set permissions for who can view and edit the information cards 430 within the information space window 430. This can include users that are assigned permissions for managing the information space and users for consuming the information space (e.g., users that have membership for viewing the information space 430).

After a new information space is created, a new header for the created information space can be added to the sidebar 416 creating a new category 524 for membership. The creation of the information space and category 524 may also include adding members to the information space. Members can be any combination of users that are intended to view the content that will be posted within the information space. The members can be added using any combination of methods, for example, manual entry of email, usernames, etc., importing a contacts file, selecting from a list of available contacts, or a combination thereof. Contacts can also be categorized into groups such that members are assigned to one or more groups and information can be shared with particular groups. For example, a business can include separate groups for each of its departments or product lines. Similarly, groups can be created by an administrator of the space. For example, a marketing group can be created that includes members that are associated with the marketing team. The groups can be created using any combination of methods. For example, a user can select a group name and everyone in that group will be added automatically, or individual members can be selected and added to the group manually, or a combination thereof. Similar steps can be taken to edit members for the information space once the information space has been created.

In some instances, upon creation of a new information space, the user can select an icon for the communication portal 314 itself, as a new icon as a subset to the communication portal 314 icon (e.g., accessible via drop down menu 428), or to be added as a new icon to the available options. Having multiple option icons can be preferable when multiple companies have their own information spaces available to different classes of users. For example, potential customers may be members to different information spaces for different companies and it may be advantageous to assign information spaces for each company to its own option within the drop down menu 428.

Although FIGS. 5A and 5B show a separate GUI 500 for adding and organizing content, in alternative embodiments, all users may have the ability to access an editing menu to create, edit, organize content from the base application. Similarly, the GUI 500 can operate sharing elements from a combination of the user home page 302, the chat interface 304, the voice over IP phone interface 306, the virtual meetings interface 308, the contacts interface 310, and the third party applications interface 312. For example, the communication portal interface 314 can share the same input mechanism as the chat interface 304 and can select members using elements from the chat interface 304 and contacts from the contacts interface 310 such that all of the interfaces may work in combination as part of the overall base application.

Figure 6:
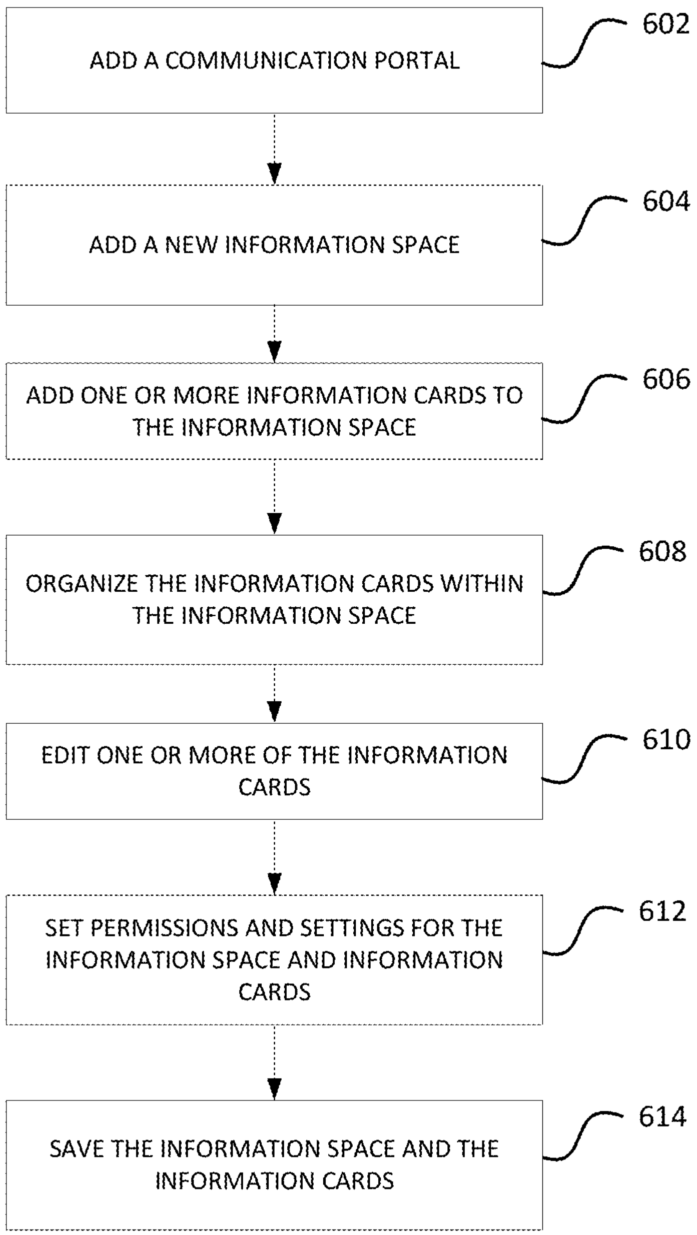
FIG. 6 is a flow chart depicting a process for creating an information space in accordance with various embodiments.

Referring now to FIG. 6, FIG. 6 shows an example method 600 for creating an information space including one or more information cards. The method 600 of FIG. 6 will be described with respect to elements discussed with respect to FIGS. 1-5B, however, any suitable system according to this disclosure may be employed. Initially, a user loads an application including a plurality of functionalities including a communication portal interface. The application can include any combination of applications, for example, it can be a virtual conference application provided by a video conference provider (e.g., video conference provider 210). To implement the method 600 of FIG. 6, the user may need to be authorized and authenticated before proceeding with the steps of method 600. For example, the user may need to be an administrator with permissions to access the tools for creating an information space including one or more information cards. The administrator level and permissions can be determined based on a user's login credentials, and/or version of the base application they are running (e.g., running in administrative mode, an administrative version of the application, etc.).

At block 602, the virtual conference provider receives a request to add or create a new communication portal within the base application. The request can be received through one of the menus provided through the GUI. For example, a user can access a menu within the GUI or an administrative portal. In response to the request, the virtual conference provider can update a graphical user interface to enable or add an option to accessing the communication portal or a new communication portal, respectively. If the communication portal was previously disabled, there may be a greyed out icon that is not selectable by unauthorized users, such as users other than the administrator or other permitted users for creating information spaces and/or information cards. When the icon is activated, it will be updated to reflect that it is active to other users and upon selection by a user, the virtual conference provider will update the GUI to load a communication portal interface. In the case of activating or accessing an existing information space for editing, the virtual conference provider can update the GUI to show at least an information space window with one or more information cards situated therein, as shown FIG. 5A. If no information space previously existed, the GUI can be updated with a blank information space and corresponding sidebar with options to add a new space (e.g., new space header 514 and/or add new information card option 540). The GUI may also include a welcome page with quick tutorial/tips when it is a user's first time navigating to the space.

At block 604, a request to add or create a new information space is received. For example, the request can be received in response to a user selecting a new space header icon within the GUI (e.g., new space header 514). In response to the request, the virtual conference provider can update a graphical user interface to add a new information space including a blank new information space window 430 and a blank icon linked to the new information space (e.g., memberships and/or categories 524 icon in sidebar 416). The new information space can be associated with the communication portal from block 602. The GUI can also include providing an editable title to be updated by the user. Once the user edits the title, the title header for the new space will be updated as well as the corresponding linked icon.

At block 606, a request to add or create an information card is received. For example, the request can be received in response to a user selecting a new information card option within the information space window provided by the GUI (e.g., new information card option 540). In response to the request, the virtual conference provider can update a graphical user interface to update the information space window 430 to include an information card editor, for example, as shown in FIG. 5B, including a blank new information space window 430 and an actionable panel 542 including one or more editing tools and an input field 538 for entering text. The GUI can also include providing an editable title to be updated by the user. Once the user edits the title, the title header for the new information card will be updated. The information card can be created by the user using a combination of text, images, video, audio, etc. as discussed in greater detail with respect to FIGS. 4A and 4B. In response to receiving a selection of the publish button 546, the virtual conference provider can save the information card 418 and add it to the information space.

At block 608, one or more adjustments to the layout of one or more of the information cards within the information space window 430 is received. The one or more adjustments can be received in response to a user interacting with the information cards within the information space window 430. The interaction can be performed using any combination of input devices, such as keyboard, mouse, touchscreen, etc. Based on the received adjustment, the layout of the information cards can be updated and saved within the information space. For example, the user can use a mouse to click and drag one of the information cards to a different location.

At block 610, a selection of an information card for editing is received. For example, the request can be received in response to a user selecting an existing information card within the information space window. In response to the request, the virtual conference provider can update the information space window with the information card editor, for example, as shown in FIG. 5B, including the existing content of the information card and the actionable panel 542 including one or more editing tools and an input field 538 for entering text. The information card can be edited by the user in a similar process discussed in block 606. In response to receiving a selection of the publish button 546, the virtual conference provider can save the updated information card 418 and create a historical copy of the previous version of the information card.

At block 612, permissions and settings for the information space and the information card(s) are received. The permissions and settings can be received through a user input into a menu provided by the virtual conference provider. The permissions and settings can include a list of users who can create, edit, remove, etc. information spaces and information cards as well as user who are intended to receive the information spaces and information cards for viewing. The permissions can be managed and stored separately. For example, the permissions for the users, members or groups who can create, edit, remove, etc. information spaces and information cards can be stored by the application and/or the virtual conference provider, whereas the users, members or groups who are intended to receive the information spaces and information cards can be associated with the information spaces and information cards themselves and referenced by the application and/or the virtual conference provider.

At block 614, the information space and the information card(s) are provided for publication. Once a user has finished creating and/or editing an information space and the information cards in the space, the changes can be saved for viewing by other users. In some instances, a preview of the information card can be generated to be included within the information space and linked to a full version of the information card. The preview of the information card can be generated using any combination of techniques. For example, the preview of the information card can be generated by extracting a title, author, and a predetermined number of characters from the full information card.

The information spaces, information cards, and optionally, the preview information cards can be saved in any combination of configurations that allow the information to be retrieved by different client devices for viewing (e.g., via FIGS. 4A-4B). For example, the information space can be saved as a file including a title, categories, permissions (or member list), a layout for information cards and can include links to the information cards themselves or copies of the information cards can be saved within the information space. Similarly, the information cards can be saved and/or exported as a file including a title, categories, permissions (or member list), etc. All of the files can be saved by the virtual conference provider.

Figure 7:
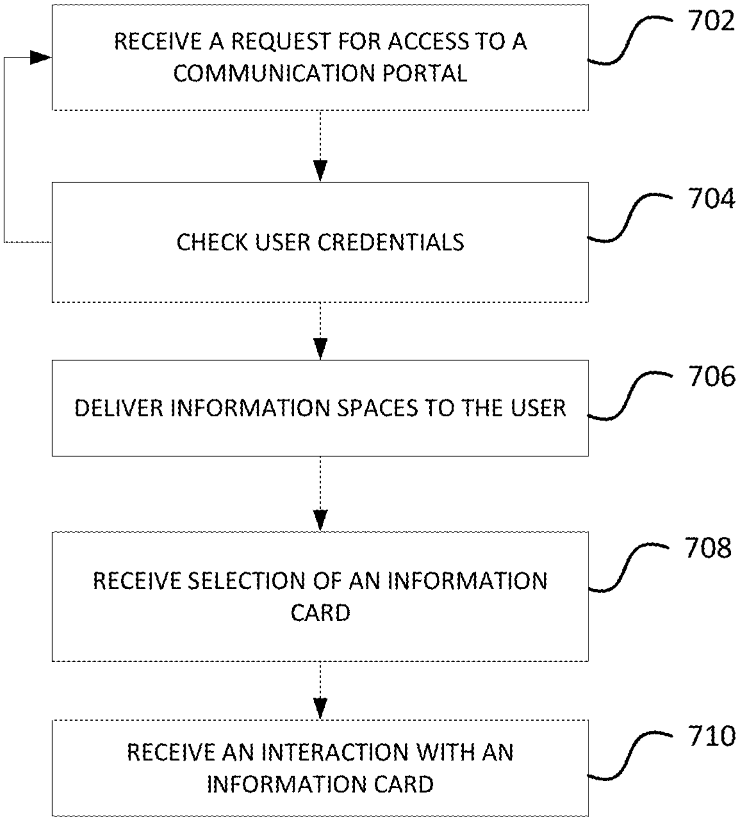
FIG. 7 is a flow chart depicting a process for interacting with an information space in accordance with various embodiments.

Referring now to FIG. 7, FIG. 7 shows an example method 700 for accessing and interacting with an information space including one or more information cards. The method 700 of FIG. 7 will be described with respect to elements discussed with respect to FIGS. 1-5B, however, any suitable system according to this disclosure may be employed. Initially, a user loads an application including a plurality of functionalities including a communication portal interface.

At block 702, receive a request to load a communication portal from a client device. The request can be received in response to a use selecting the communication portal interface 314 on the GUI 300, 400.

At block 704, check identification and/or credentials of the requesting client/user. The user credentials can be checked to determine whether or not the user is one of the users designated as having permission to access the communication portal and/or what information spaces within the communication portal that the user can access. The credential check can be performed using any combination of methods. For example, the virtual conference provider can compare a username to a database including a plurality of information spaces to determine whether the username matches any of the approved users for those information spaces. If there is a match, the method 700 can advance to step 706, otherwise, the method can return to the previous step or terminate. A second matching can also be performed on the information cards associated with any matching information spaces. For example, a user may have access to an announcements space but only for information cards related to topics for "people" and "in the news" instead of all of the information cards associated with the announcements space.

At block 706, information spaces and corresponding information cards that the user is granted access can be provided to the user for viewing. For example, as shown in FIG. 4A, the GUI running on the user's client device can be updated to include the information spaces and the corresponding information cards. In some instances, the layout of the information cards can also be provided such that the information cards can be organized in the intended layout. As shown in FIG. 4B, initially the user is provided with previews of the information cards organized within the information space window and not the information cards in their entirety.

At block 708, receive a selection of one of the information cards. In response to receiving a selection of one of the information cards, the video conference provider can update the information space window to show the entirety of the selected information card. This step can include following a link from the preview card to a source card rendered within the window, for example, as shown in FIG. 4B.

At block 710, receive an interaction with the loaded information card. The interaction can include any combination of options provided by the GUI, such as for example, commenting, sharing, saving, etc. the information card. In response to receiving an interaction with the information cards, the video conference provider can facilitate the interaction. For example, if a user selects the comment option, then the GUI will render a message composition panel to receive a user input. Once a user has submitted an input, then the information card can be updated to include that user's comment, for example, as shown in FIG. 4B. The provider can facilitate any combination of interactions, including scrolling through comments, adding reactions to comments, closing the information card, selection of another information card or selection of another information space, etc.

While the operations of processes 600 and 700 are described as being performed by the systems 100, 200, it should be understood that any suitable device may be used to perform one or more operations of this process. Processes 600 and 700 described above) are illustrated as logical flow diagrams, each operation of which represents a sequence of operations that can be implemented in hardware, computer instructions, or a combination thereof. Additionally, any of the blocks can be performed by the various components of the system 100, 200. For example, the blocks can be performed on a server or cloud, on a client computing device, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes 600 and 700.

Figure 8:
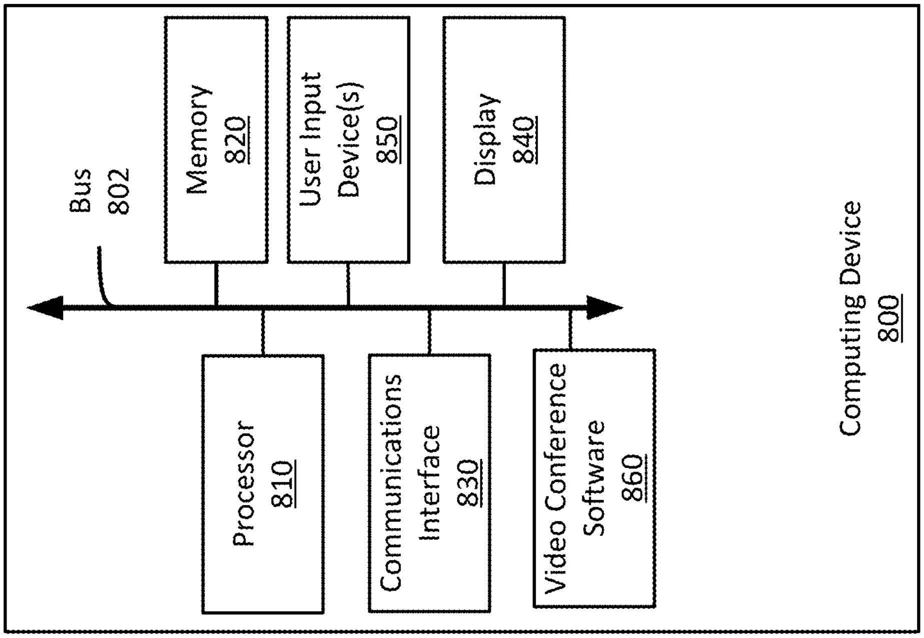
FIG. 8 shows an example computing device suitable for use with systems and methods in accordance with various embodiments.

Referring now to FIG. 8, FIG. 8 shows an example computing device 800 suitable for use in example systems or methods according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods according to different examples, such as part or all of the example methods 600 and 700 described above with respect to FIGS. 6 and 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a video conferencing application 860 to enable a user to join and participate in a video conference, such as a conventional meeting or webinar, by receiving multimedia streams from a video conference provider, sending multimedia streams to the video conference provider, joining and leaving breakout rooms, engaging in participant interactions, etc. such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:

receiving, from a first client device, a request to create a communication portal, the communication portal comprising one or more information spaces, each information space being filterable by category and comprising one or more information cards, each information card associated with one or more category;

receiving, from the first client device, a first indication to create a first information space associated with the communication portal and a first category;

receiving, from the first client device, first information to be posted as a first information card within the first information space and layout information associated with the first information space, wherein the first information is related to the category;

receiving, from a second client device, a second indication to access the information space; and providing the first information card and the layout information to the second client device.

2. The method of claim 1, wherein:

the first client device is joined to a video conference hosted by a video conference provider, the video conference being joined by a plurality of client devices; and the video conference provider outputs second information about the first information space to each client device of the plurality of client devices to cause the first information space to be displayed during the video conference as part of a video conference user interface ("UI").

3. The method of claim 1, wherein the first information includes at least one of a text string, an image, a binary audio file, a video file, or a hyperlink.

4. The method of claim 1, further comprising:

receiving, from the second client device, a third indication to follow the first information card;

receiving, from a third client device, second information about an edit to the first information posted as the first information card; and outputting, to the second client device, a message including the second information about the edit to cause a notification.

5. The method of claim 1, further comprising receiving, from the second client device, second information about an adjustment to the layout information about the first information space including a change to the position of the first information card.

6. The method of claim 1, wherein the first information space is accessible using a UI control displayed by the first client device, the UI control included in at least one of an email application, a word processing application, a web browser, a video communication application, a calendar application, a chat application, or a combination thereof.

7. The method of claim 1, further comprising:

receiving, from the first client device, second information about a first edit to the first information posted as the first information card;

updating the first information posted as the first information card using the first edit; and providing the first information card, including the second information about the first edit, to the second client device.

8. The method of claim 7, further comprising:

receiving, from a third client device, third information about a second edit to the first information posted as the first information card prior to updating the first information; and outputting, to the third client device, a message about the first edit and a rejection of the second edit.

9. The method of claim 1, wherein the first indication and the first information are received from a UI displayed by the first client device, the UI displayed by the first client device comprising UI controls for editing the title of the first information space, editing the first information, and adding images.

10. The method of claim 1, further comprising:

generating a file comprising a representation of the first information space and the layout information associated with the first information space; and storing the file.

11. The method of claim 1, further comprising generating a preview of the first information card comprising the title of the first information card, the author of the first information card, and a predetermined number of characters of the first information.

12. A system comprising:

one or more processors; and a memory coupled to the one or more processors, the memory storing a plurality of instructions executable by the one or more processors, the plurality of instructions comprising instructions that when executed by the one or more processors cause the one or more processors to:

receive, from a first client device, a request to create a communication portal, the communication portal comprise one or more information spaces, each information space bee filterable by category and comprise one or more information cards, each information card associated with one or more category;

receive, from the first client device, a first indication to create a first information space associated with the communication portal and a first category;

receive, from the first client device, first information to be posted as a first information card within the first information space and layout information associated with the first information space, wherein the first information is related to the category;

receive, from a second client device, a second indication to access the information space; and provide the first information card and the layout information to the second client device.

13. The system of claim 12, wherein:

the first client device is joined to a video conference hosted by a video conference provider, the video conference being joined by a plurality of client devices; and the video conference provider outputs second information about the first information space to each client device of the plurality of client devices to cause the first information space to be displayed during the video conference as part of a video conference UI.

14. The system of claim 12, wherein the first information includes at least one of a text string, an image, a binary audio file, a video file, or a hyperlink.

15. The system of claim 12, further comprising:

receiving, from the second client device, a third indication to follow the first information card;

receiving, from a third client device, second information about an edit to the first information posted as the first information card; and outputting, to the second client device, a message including the second information about the edit to cause a notification.

16. The system of claim 12, further comprising:

receiving, from the first client device, second information about a first edit to the first information posted as the first information card;

updating the first information posted as the first information card using the first edit;

providing the first information card, including the second information about the first edit, to the second client device;

receiving, from a third client device, third information about a second edit to the first information posted as the first information card prior to updating the first information; and outputting, to the third client device, a message about the first edit and a rejection of the second edit.

17. A non-transitory computer-readable memory storing a plurality of instructions executable by one or more processors, the plurality of instructions comprising instructions that when executed by the one or more processors cause the one or more processors to:

receive, from a first client device, a request to create a communication portal, the communication portal comprise one or more information spaces, each information space bee filterable by category and comprise one or more information cards, each information card associated with one or more category;

receive, from the first client device, a first indication to create a first information space associated with the communication portal and a first category;

receive, from the first client device, first information to be posted as a first information card within the first information space and layout information associated with the first information space, wherein the first information is related to the category;

receive, from a second client device, a second indication to access the information space; and provide the first information card and the layout information to the second client device.

18. The non-transitory computer-readable memory of claim 17, wherein:

the first client device is joined to a video conference hosted by a video conference provider, the video conference being joined by a plurality of client devices; and the video conference provider outputs second information about the first information space to each client device of the plurality of client devices to cause the first information space to be displayed during the video conference as part of a video conference UI.

19. The non-transitory computer-readable memory of claim 17, wherein the first information includes at least one of a text string, an image, a binary audio file, a video file, or a hyperlink.

20. The non-transitory computer-readable memory of claim 17, further comprising:

receiving, from the first client device, second information about a first edit to the first information posted as the first information card;

updating the first information posted as the first information card using the first edit;

providing the first information card, including the second information about the first edit, to the second client device;

receiving, from a third client device, third information about a second edit to the first information posted as the first information card prior to updating the first information; and outputting, to the third client device, a message about the first edit and a rejection of the second edit.

* * * * *